Figure 1:
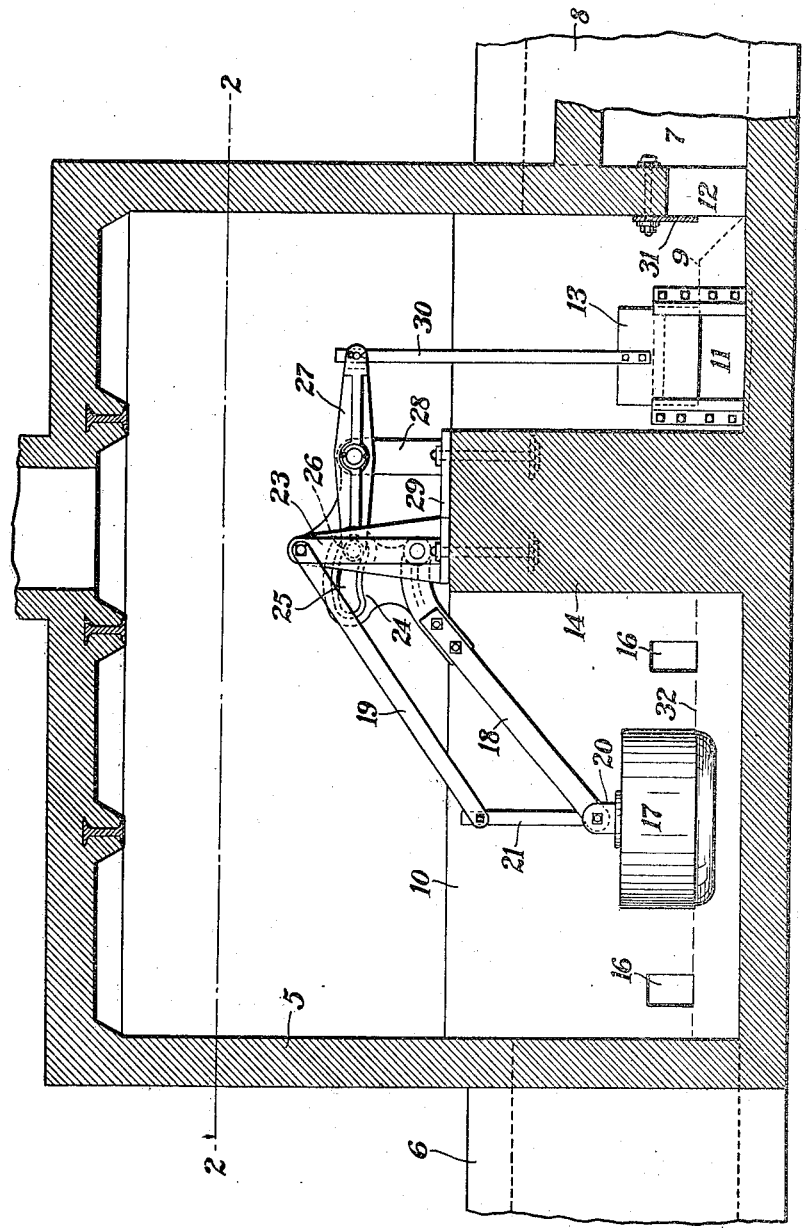

A. R. SELDEN.
FLOW CONTROLLER FOR SEWERS.
APPLICATION FILED FEB. 24, 1914.

1,190,958.

Patented July 11, 1916.
2 SHEETS—SHEET 2.

WITNESSES:
Clarence W. Carroll
L. Thon

INVENTOR:
Arthur R. Selden
by his attorneys
Davis & Dorsey

UNITED STATES PATENT OFFICE.

ARTHUR R. SELDEN, OF ROCHESTER, NEW YORK.

FLOW-CONTROLLER FOR SEWERS.

1,190,958.  Specification of Letters Patent.  Patented July 11, 1916.

Application filed February 24, 1914. Serial No. 820,705.

*To all whom it may concern:*

Be it known that I, ARTHUR R. SELDEN, a citizen of the United States, and resident of Rochester, in the county of Monroe and State of New York, have invented certain new and useful Improvements in Flow-Controllers for Sewers, of which the following is a specification.

This invention relates to means for controlling the flow of fluids in a sewer in such a manner as to prevent the normal discharge, from the sewer to the sewage-disposal plant or other final receptacle for sewage, from being unduly augmented when the sewer is abnormally loaded by surface-drainage or otherwise.

Where both house-sewage and surface-water are discharged into the same district-sewer it is customary to provide, in addition to the usual means for disposing of the normal flow of sewage, outlets for discharging directly, into some body of water or other suitable place, the great volume of water which results occasionally from surface-drainage in the case of heavy rain-storms or thaws. In such an arrangement the district-sewer must be provided, therefore, with a normal outlet through which all of the sewage normally flows to the trunk-sewer and also with an emergency or overflow outlet, the latter being arranged above the normal level of the sewage in the district-sewer, so that under normal conditions no sewage escapes from the emergency-outlet. Since it is preferable, so far as possible, to discharge the sewage through the normal outlet, this outlet is made large enough to accommodate as great a volume of sewage as can be disposed of in the usual manner. When the flow of sewage in the district-sewer is greatly augmented by the accession of surface-water the surplus volume is discharged through the emergency-outlet. In such a case, however, owing to the rise in the level of the sewage in the district-sewer, the head under which sewage is discharged through the normal outlet is substantially increased, and this increase in head will tend to cause a greatly increased flow through the normal outlet and thus to overload the trunk-sewer. The purpose of the present invention is to avoid such overloading by limiting the flow from the normal outlet automatically to a predetermined maximum, however the level of the fluid in the district-sewer may rise. To this end I employ a valve or gate for regulating the size of the normal outlet-opening, and to automatically regulate the position of this gate I employ mechanism, preferably of the float-controlled type, actuated by the rise in the level of the fluid in the district-sewer. This mechanism is arranged to close the normal outlet-opening gradually as the fluid-level rises, thus compensating for the increase in head in the fluid, and in order that this compensation may result in an approximately constant flow through the normal outlet-opening, I employ means, preferably in the form of cam-mechanism, so arranged as to vary the area of this opening in conformity with the ascertained laws governing the flow of liquid through an orifice under varying head.

Other features of the invention will be set forth in connection with the following description of the preferred embodiment of the invention.

Figure 2:
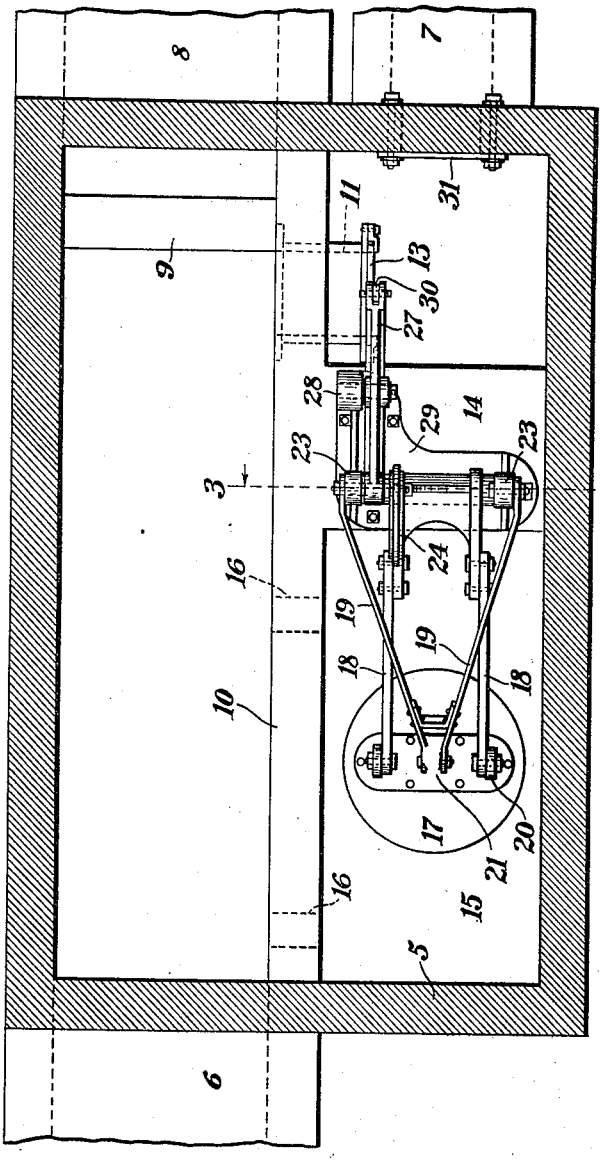
Figure 3:
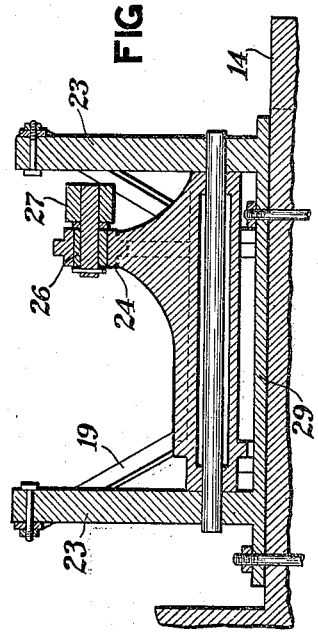

In the accompanying drawings: Figure 1 is a side-elevation, partly in vertical section, of apparatus embodying the present invention; Fig. 2 is a horizontal section on the line 2—2 in Fig. 1; and Fig. 3 is a detail-view, in vertical section on the line 3—3 in Fig. 2 but on a larger scale.

In the drawings I have shown a masonry chamber 5 which contains the apparatus of the present invention, and into which sewage is discharged through a district sewer-pipe or conduit 6. The chamber is provided with two outlet-pipes or conduits 7 and 8. The pipe 7 is that through which sewage is normally discharged to the trunk-sewer. The pipe 8 is that through which the surplus sewage is discharged in case the sewage is flooded by surface-water or otherwise.

To prevent the discharge of sewage through the pipe 8 under normal conditions I employ a dam 9 which obstructs admission to the pipe 8. I also employ a longitudinal wall 10 within the chamber 5, and this wall is perforated with a rectangular opening 11, which constitutes what is hereinafter designated as the "normal outlet" for sewage. So long as the fluid-level does not rise above the top of the dam 9 all of the sewage flows through the outlet 11, and thence, through an opening 12 in the end of the chamber 5, to the pipe 7.

When the flow of sewage becomes greater than can pass through the outlet 11 the surplus sewage flows over the dam 9 and escapes through the pipe 8. This involves a rise in the level of the fluid behind the dam so that the sewage is discharged through the opening 11 under an increased head. To compensate for this increased head and limit the flow through the opening 11 to the predetermined maximum, I employ a valve in the form of a sliding gate 13, adapted to partially close the opening 11 when necessary. This gate is controlled by mechanism mounted upon a pier 14, which constitutes also a closure between the wall 10 and the side-wall of the chamber 5. At the left of the pier 14 is a float-chamber 15, which is connected with the district-sewer through openings 16 in the wall 10, so that the level of fluid in this float-chamber may rise with the rise in the sewer. A hollow float 17, adapted to rise and fall in the float-chamber, is connected with lower and upper pairs of links 18 and 19, the links 18 being pivoted to lugs 20 on the float, while the links 19 are pivoted to the upper end of a stem 21 projecting upwardly from the float. The other ends of the links are pivoted to columns 23 rising from a base-plate 29 fixed upon the pier 14. The linkage just described is such as to permit the valve to rise and fall freely, but to maintain it always in horizontal position and prevent lateral movement.

The links 18 constitute lever-arms rigidly connected with a cam-plate 24, which is provided with a curved slot 25. This slot receives a roller 26 mounted on the end of a lever 27, which is pivoted upon a column 28 rising from the base-plate 29. The opposite end of the lever 27 is pivoted to a rod 30 fixed to the gate 13. The cam-slot 25 is so shaped, as shown in Fig. 1, that as the float rises the roller 26 is raised by the cam, thus causing the lever 27 and the rod 30 to depress the gate 13 and partially close the outlet-opening 11. Accordingly, when the level of the sewage in the trunk-sewer rises above the top of the dam 9 the float 17 is raised in proportion above its normal position, thus closing the outlet-opening 11 and diminishing the area of this opening inversely with the increase in head in the sewage.

The shape of the cam-slot 25 is determined in accordance with the rate of flow of a liquid through an opening, as modified by changes in the head under which the liquid flows. For any given case this may be readily determined by experiment, but as a practical approximation it may be assumed that the area of the outlet-opening should be varied inversely as the square-root of the effective head, and the cam-slot may then be laid out in accordance with this formula, or with some more exact equation.

Under unusual conditions of flooding the flood-outlet 8 may be insufficient to accommodate the sewage in excess of the normal flow through the outlet-opening 11, and in such a case it may be desirable to somewhat augment the flow through the pipe 7. For this purpose I have shown the wall 10 as terminating slightly above the top of the pipe 6, so that excessive rise in the fluid in the chamber will cause fluid to flow over this wall, and such fluid will therefore be discharged directly through the opening 12, without passing through the normal outlet-opening 11. Even in such a case, however, it is necessary to limit to some degree the flow through the pipe 7, and accordingly I have shown a plate 31 applied to the opening 12 in such a manner as to restrict its area to the equivalent of the full normal area of the opening 11. Owing to the increased head a somewhat greater quantity of sewage may flow through the opening 12, but this flow will be limited to the amount which can be safely discharged into the trunk-sewer.

My invention is not limited to the embodiment thereof hereinbefore described and illustrated in the accompanying drawings, but it may be embodied in various other forms within the nature of the invention as it is defined in the following claims.

I claim:—

1. The combination, with a sewer having a normal outlet and a flood-outlet, of means controlling the area of the normal outlet and actuated by the rise of fluid in the sewer, said means being adapted to vary said area as the fluid-level varies, approximately in inverse proportion with the square-root of the effective head, so as to maintain substantially constant the discharge through the normal outlet.

2. The combination, with a sewer having a normal outlet and a flood-outlet, of a gate for varying the area of the normal outlet, a float actuated by the fluid in the sewer, and mechanism, including a cam, connecting said float and gate to actuate the latter, the cam being shaped to move the gate and vary the area of the normal outlet, as the effective head in the sewer varies, in conformity with the variation of the rate of flow due to the variation in said head, so as to maintain a substantially constant discharge through the normal outlet.

3. The combination, with a sewer having a normal outlet and a flood-outlet, of a gate for varying the area of the normal outlet, a float actuated by the fluid in the sewer, and mechanism, including a cam, connecting said float and gate to actuate the latter, the cam being shaped to move the gate so as to vary the area of the normal outlet approximately in inverse proportion with the square-root of the effective head in the sewer.

4. In combination with a sewer-line, a chamber, into which the sewer-line discharges, provided with a compartment to receive such sewage, a normal outlet from said compartment, a compartment into which said normal outlet discharges, an overflow opening into the latter compartment, and a flood-outlet from the receiving-compartment; a valve for varying the area of said normal outlet, and means controlling the valve, and actuated by the rise of fluid in the receiving-compartment, said means being adapted to move the valve toward closed position as the fluid-level rises in the receiving-compartment.

ARTHUR R. SELDEN.

Witnesses:
 FARNUM F. DORSEY,
 D. GURNEE.